UNITED STATES PATENT OFFICE.

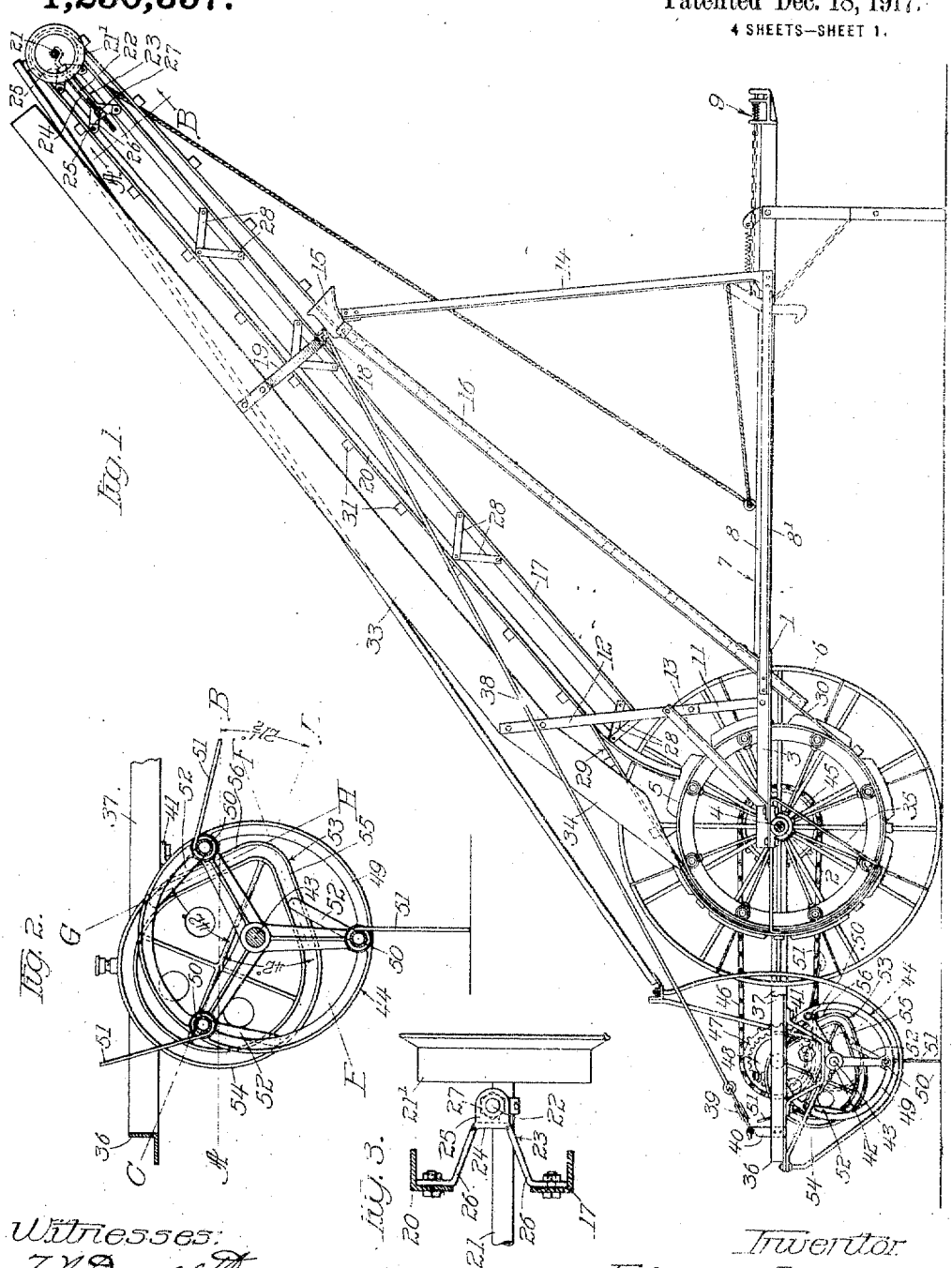

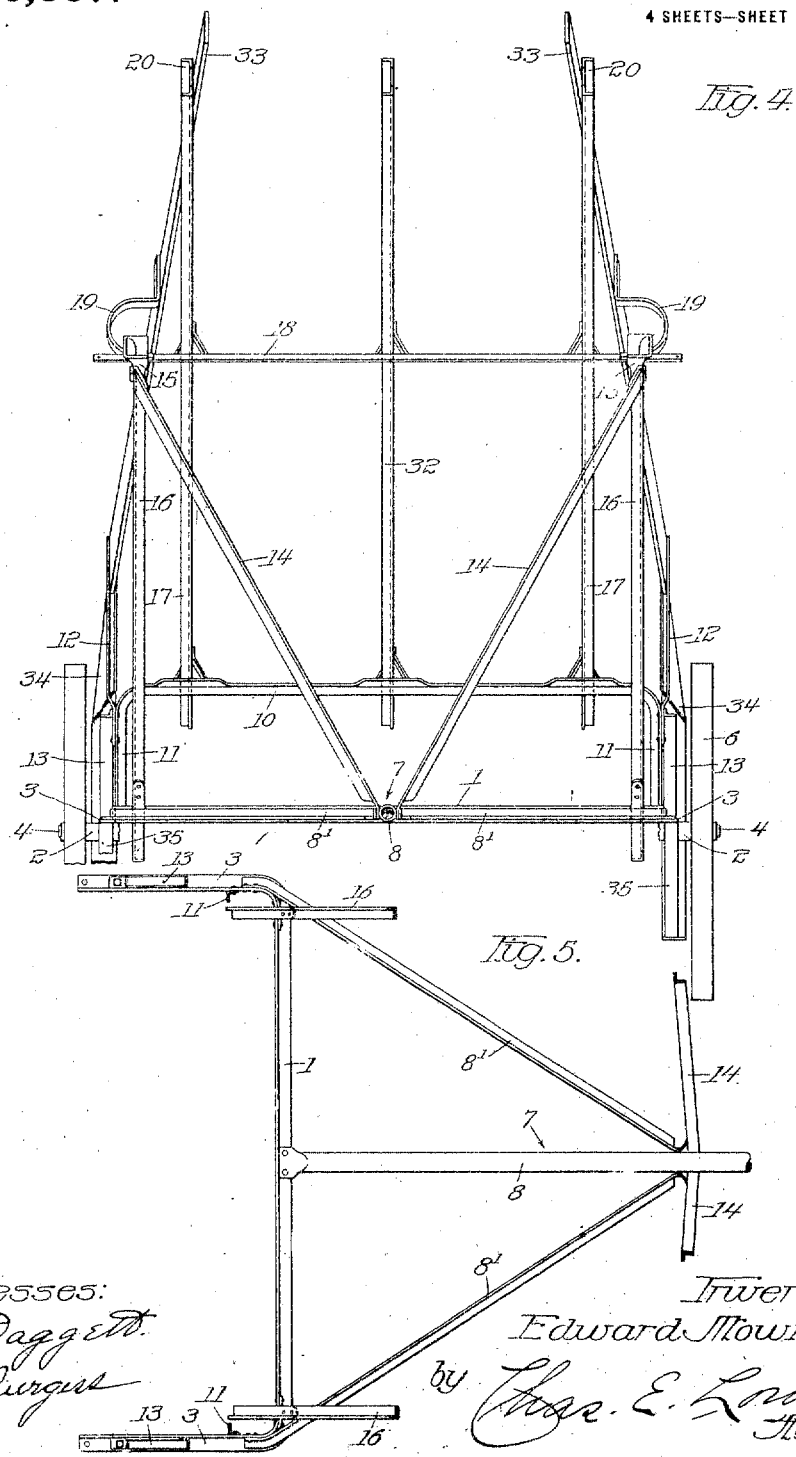

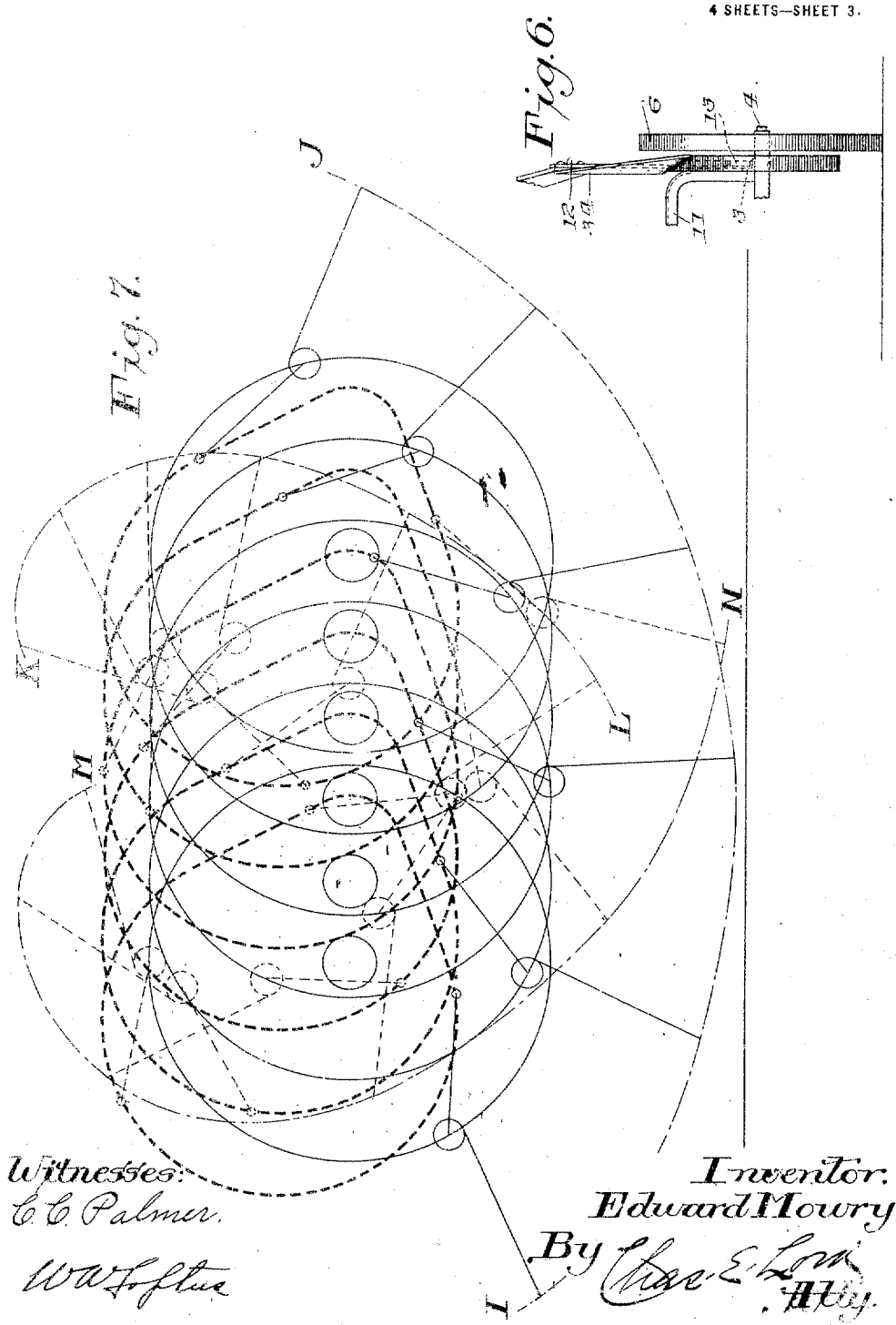

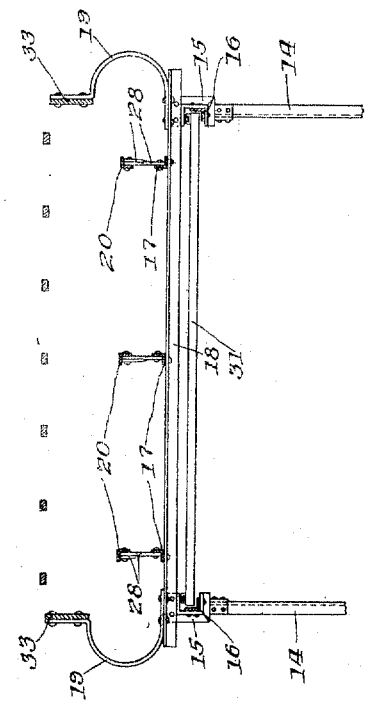

EDWARD MOWRY, OF STERLING, ILLINOIS, ASSIGNOR TO INTERNATIONAL HARVESTER COMPANY OF NEW JERSEY, A CORPORATION OF NEW JERSEY.

HAY-LOADER.

1,250,337.                    Specification of Letters Patent.    Patented Dec. 18, 1917.

Application filed October 31, 1913.   Serial No. 798,458.

*To all whom it may concern:*

Be it known that I, EDWARD MOWRY, a citizen of the United States, residing at Sterling, in the county of Whiteside and State of Illinois, have invented certain new and useful Improvements in Hay-Loaders, of which the following is a full, clear, and exact specification.

My invention relates to hay loaders.

It has for its object to provide a light and strong hay loader adapted to operate efficiently under service conditions and of such a character as to withstand long use in service. I attain these objects by the provision of an improved hay loader construction wherein the rakes are mounted on an improved frame and controlled in an improved manner, the several other coöperating parts of the device being likewise specifically improved as hereinafter set forth.

In the accompanying drawings I have shown one embodiment which my invention may assume in practice. It is to be understood, however, that the form illustrated herein is chosen for purposes of illustration and may be modified.

Figure 1 is a side elevation of a hay loader having my invention embodied in its construction;

Fig. 2 is a detached detail of Fig. 1, designed to show the form of the rake controlling cam for the raking cylinder;

Fig. 3 is a cross section of one side of the elevator frame, taken on line A—B, at its upper end, designed to show the manner of mounting the carrier tightener:

Fig. 4 is a front elevation of the elevator frame;

Fig. 5 is a top plan view of the draft frame;

Fig. 6 is a rear elevation of one of the wheels showing the shield in position thereon;

Fig. 7 is a diagram illustrating the operation of the cylinder, cam and rake teeth; and Fig. 8 is a sectional view taken in the plane of line 8—8, Fig. 1, looking in the direction indicated by the arrow and showing how the endless carrier is guided.

The same reference characters designate like parts throughout the several views.

Referring to the drawings, 1 represents a U-shaped wheel frame member having bearing boxes 2 secured to the rear ends of its side members 3, and 4 represents a driving axle journaled in the bearing boxes and carrying a common form of raking cylinder 5, and having carrying and traction wheels 6 mounted upon opposite ends thereof. 7 represents a draft frame including a longitudinally centrally disposed tubular member 8, having its rear end secured to the front member of the U-shaped frame member 1, and forwardly converging side frame members $8^1$, having their rear ends secured to the side members of the wheel frame 1, and their front converging ends to the draft frame member 8, near its front end, and 9 represents a hitching device secured to the front end of member 8, whereby the machine may be operatively connected to a wagon. 10 represents a substantially vertical U-shaped frame member having the lower ends of its side members 11 secured to the side members of the wheel frame member 1 near their front ends, and 12 represents vertically arranged frame members upon opposite sides of the machine, having their lower ends secured to the upper ends of the side members 11 of the U-shaped frame member 10. 13 represents brace members at opposite sides of the machine, having their front ends secured to side members 11 of the frame member 10 and the lower ends of the vertical frame members 12 and inclined rearward and downward, and having their lower ends secured to the rear ends of the side members 3 of the wheel frame member 1. 14 represents upwardly and outwardly diverging frame members disposed in substantially a vertical plane, having their lower ends secured to the tubular member 8, near its front end, and their upper ends to curved carrier guides 15 upon opposite sides of the machine, and 16 represents inclined carrier guides and frame members having their upper ends secured to the curved carrier guides and their lower ends to opposite ends of the front member of the U-shaped frame member 1.

The sides of the forwardly and upwardly inclined elevator frame include lower angle steel members 17 upon opposite sides of the machine, having their lower ends secured to the substantially vertical U-shaped frame member 10 intermediate the ends thereof, and their middle part to a transverse elevator frame member 18 having its opposite ends secured to the carrier guides 15, and 19 represents outwardly curved U-shaped members disposed at right angles with the elevator frame member 17, having their lower side members secured to the transverse frame member 18 and a part of their upper sides turned upward in parallel relation. The ends of the transverse member 18 extend beyond the carrier guides 15 and are provided with openings therein. The sides of the elevator frame also include upper angle steel members 20 disposed parallel with members 17, spaced apart therefrom and having their lower ends secured by braces to the substantially vertical U-shaped frame member 10, and extending rearward therefrom are curved downward and their middle portions secured by braces to the transverse elevator frame member 18. 21 represents a transversely disposed carrier supporting shaft at the upper end of the elevator frame, and having chain supporting sheaves 21¹ journaled thereon in a common way, and having its opposite ends secured to carrier adjusting rods 22.

The rods 22 are slidably mounted in bracket members 23, which brackets include centrally and longitudinally arranged side members 24 having ear members 25 at opposite ends thereof that receive the carrier adjusting rods 22.

The bracket members are secured to the upper and lower elevator frame members by means of leg members 26 which diverge inwardly and rearwardly from opposite ends of the side members 24. The lower rear ends of the adjusting rods 22 are threaded, and 27 represents adjusting nuts thereon upon the front sides of the lower ear members, whereby the rods may be secured in any desired position of adjustment. The frame members 20 and 17 are connected together by means of four pairs of angularly arranged truss members 28, having their upper overlapping ends secured to the upper frame members 20, and their lower diverging ends to the lower frame members 17; one pair of the truss members 28 being preferably located at the lower end of the frame members 17, a second pair intermediate the U-shaped member 19 and the lower end of the member 17, a third pair opposite the U-shaped member 19, and a fourth pair between the U-shaped member and the bracket members 23. 29 represents an endless carrier having a common form, including chains 30 and cross bars 31 secured thereto and carried by the heads of the raking cylinder 5 and the chain supporting sheaves 21¹ in a common way; the upper lead of the carrier being supported by the side members 20 of the elevator frame and an intermediate frame member 32, and the lower lead of the carrier by the guide and frame members 16. 33 represents the usual hay retaining boards above the carrier, at opposite sides of the machine, having their lower ends secured to the frame members 12 and their middle parts to the upper vertical parts of the U-shaped members 19, and 34 represents sheet metal wheel shields having their upper ends secured to the lower ends of the retaining boards 33 and extending downward and rearward in substantially the same vertical plane as the boards. The shields are twisted outward near their middle in substantially a horizontal plane, having the turned portion made concentric to the axis of the carrying wheels and supported by being secured to triangular bracket members 35 that are secured to the rear ends of the side members 3 of the wheel frame 1, upon opposite sides of the machine. 36 represents a U-shaped frame member located in rear of the carrying wheels, having the front ends of its side members 37 pivotally connected with the driving axle 4; the frame being supported by means of rods 38, having their upper ends received by the openings in the extended ends of the transverse frame member 18, and their lower ends connected with short chains 39 that engage with hook members 40 secured to the rear ends of the side members 37 of the U-shaped frame member 36, whereby the position of said frame may be adjusted relative to the ground. 41 represents depending bracket members secured to the side frame members 37, and having secured to their lower ends bearing boxes 42, in which is journaled the axle 43 of a raking cylinder 44, the cylinder deriving motion from the traction wheels 6 by means including a sprocket wheel 45 carried by the axle 4, a sprocket chain 46, a sprocket wheel 47, and gear wheel 48 carried by the frame member 36. The raking cylinder 44 includes a common form of head members 49 secured to opposite ends of the axle 43, carrying a series of pivoted rake bars 50, having resilient rake teeth 51 secured thereto; the rakes being provided with crank arms 52 at one end that are controlled by a fixed cam 53 in a manner to cause the rake bars to turn about their axes and maintain the teeth in proper working position during the cycle of their rotative movement. Heretofore such rake controlling cams have been so formed that the teeth would be turned in a manner to be released from the hay as it was being delivered to the lifting mechanism, the cam being flattened more or less upon its front side for that purpose. In my improved cam the rear half 54 is made substantially semi-circular but eccentric to the axis of the raking cylinder, and terminates in a substantially straight portion 55 that is inclined forward and upward and merges into a substantially straight front portion 56 that inclines rearward and upward at the same angle with the major axis C—D as the portion 55, the cam being elongated forward of the center of the rear concentric portion, the major axis of the cam being inclined downward and forward toward the ground line.

In explanation, referring to Fig. 2, the line A—B is a horizontal or ground line, the line C—D is the major axis of the cam inclined downward and forward at an angle of approximately 21½ degrees from the ground line. The lines E—F and G—H represent the angle of inclination for the major axis C—D of the cam of the straight portions 55 and 56, respectively, which angle is approximately 42 degrees. In other words, the parts 55 and 56 are the sides of an isosceles triangle, having the diameter of the concentric rear part 54 of the cam, or its minor axis, as a base, and the major axis bisecting it.

With this improved form of cam the rake bars are controlled in a manner to cause the teeth to move in substantially a horizontal plane while raking the hay from the ground, and to be quickly turned backward to release them from their load as it is delivered to the elevator mechanism.

In Fig. 7 is shown a diagram of the cylinder head, raking teeth and cam, illustrating the various positions of these parts as they advance over the ground in operation. The elliptical line I—J represents the path of movement of the teeth at the lower side of the cylinder. The oval line K—L indicates the path through which the teeth move at the forward or elevating side of the cylinder, and the parabolic curve M—N indicates the path followed by the teeth at the rear side of the cylinder when they are being returned to raking position. It will be noted that the raking position of the teeth is a prolonged one, the ends of the teeth following an elliptical path for an extended period. At the elevating side of the cylinder the teeth are thrust outwardly to better support the hay, and when they have reached the proper point of discharge they are drawn directly rearward longitudinally. A better dumping of the hay is thus obtained. It is also to be noted that the cam member, being provided with continuous spaced walls, between which the crank arms fit, holds the teeth rigid at all times and a different operation occurs from that in which the teeth are permitted to swing freely at the upper side of the cylinder, thereby not turning over in their orbital movement.

Having shown and described a preferable form of my invention, I do not wish it to be confined to the precise details of construction shown, as many minor changes may be made in the structure without departing from the spirit of my invention.

What I claim as my invention, and desire to secure by Letters Patent, is:

1. In a hay loader, an endless conveyer, a raking cylinder located adjacent the lower end of said conveyer and including rocking tooth carrying bars, crank arms connected with said bars, and means associated with said crank arms, a portion of which means lies outside the periphery of said raking cylinder and the lower forward portion of which is pointed and is located close to the upper run of said conveyer for maintaining the teeth of said tooth carrying bars in raking position for an extended period and abruptly moving them longitudinally rearward and away from the conveyer at the end of the raking operation.

2. In a hay loader, in combination, a wheel frame, a transversely disposed and substantially vertically arranged wheel frame member having the lower ends of its side members secured to the front ends of the side members of said first frame member, vertically disposed bars having their lower ends secured to the side members of said vertical frame member, brace members having their front ends secured to the upper ends of the side members of said vertical frame member and inclined downward and rearward and having their opposite ends secured to the rear ends of the side members of said wheel frame, and an elevator frame having its lower end secured to the transversely disposed frame.

3. In a hay loader, in combination, a wheel frame, a draft frame including a centrally disposed longitudinal member having its rear end secured to said wheel frame member, and forwardly converging members having their rear ends secured to the front ends of the side members of said wheel frame member and their front ends to said longitudinal draft frame member, an elevator including upper frame members and an endless carrier, an elevator supporting frame including vertically disposed members having their lower ends secured to the front end of said draft frame, curved carrier guides upon opposite sides of the machine having the upper diverging ends of said vertically disposed members secured thereto, and inclined carrier guides having their upper ends secured to said curved guides and their lower ends to the front side of said wheel frame member.

4. In a hay loader, in combination, a wheel frame, an axle carried by said wheel frame, traction wheels mounted upon said axle, a draft frame connected with said wheel frame, elevator mechanism including a frame having its lower end supported by said wheel frame, an endless carrier, said elevator frame including side members comprising upper and lower bars spaced apart in parallel relation and connected by means of a series of pairs of strut members, a carrier tightener including a transverse shaft, bracket members upon opposite sides of the machine having angularly disposed leg members secured to the upper and lower bars of said elevator frame side members, threaded rods slidably carried by said brackets and secured to said transverse shaft, vertically disposed upwardly diverging elevator supporting bars having their lower ends secured to said draft frame and their upper ends connected with the side members of said elevator frame, and downwardly and rearwardly inclined carrier guides having their upper ends connected with the upper ends of said vertically disposed bars and their lower ends with said wheel frame.

5. In a hay loader, in combination, an endless conveyer, a raking cylinder located adjacent said conveyer including rocking tooth carrying rake bars, crank arms connected with said bars, a rake controlling cam having said arms engaging therewith and elongated in the direction of the line of draft of the machine, having the major axis thereof inclined downward and forward, a portion of the cam in rear of the minor axis being semi-circular and merging into substantially straight portions that converge forward toward the major axis, the apex of the cam being located nearest the endless conveyer whereby a long raking action is obtained and the hay is thrown directly onto the conveyer, the rake teeth then being withdrawn rearwardly away from the conveyer.

6. In a hay loader, in combination, an endless conveyer, a raking cylinder located adjacent the lower end of the conveyer and including rocking tooth carrying rake bars, crank arms connected with said bars, a rake controlling cam having said arms engaging therewith and elongated in the direction of the line of draft of the machine, having the major axis thereof inclined downward and forward toward the lower end of the conveyer, a part of the cam in rear of the minor axis being semi-circular and merging into substantially straight portions that form an isosceles triangle with the minor axis as a base.

7. In a hay loader, a wheel frame, an elevator frame, an endless carrier on the elevator frame, and guide means for said carrier extending between said elevator and wheel frames.

8. In a hay loader, a frame, an endless carrier on said frame, and a supporting member on said frame forming a guide in which a portion of said carrier moves.

9. In a hay loader, a wheel frame, an elevator frame, an endless carrier on said elevator frame, and inclined carrier guides forming brace members between said elevator and wheel frames.

10. In a hay loader, a main frame, an elevator frame supported at its lower end on said main frame, an endless carrier on said elevator frame, and guides for said carrier secured at their upper ends to the elevator frame intermediately thereof and connected at their lower ends to the forward part of the main frame.

11. In a hay loader, a main frame, an elevator frame attached at its lower end thereto, vertical supports between said main frame and intermediate portion of the elevator frame, and inclined supports between the main and elevator frames, said supports acting also as positive carrier guides.

In testimony whereof I affix my signature, in the presence of two witnesses.

EDWARD MOWRY.

Witnesses:
W. H. BARNUM,
J. K. MYER.